June 14, 1966  R. WALDHERR  3,255,488
WIDE SLOTTED NOZZLE FOR PRODUCING FILM
FROM EXTRUDABLE MATERIALS
Filed March 25, 1964  2 Sheets-Sheet 1

INVENTOR:
RUDOLF WALDHERR
by
Jacob L. Kollin,
ATTORNEY

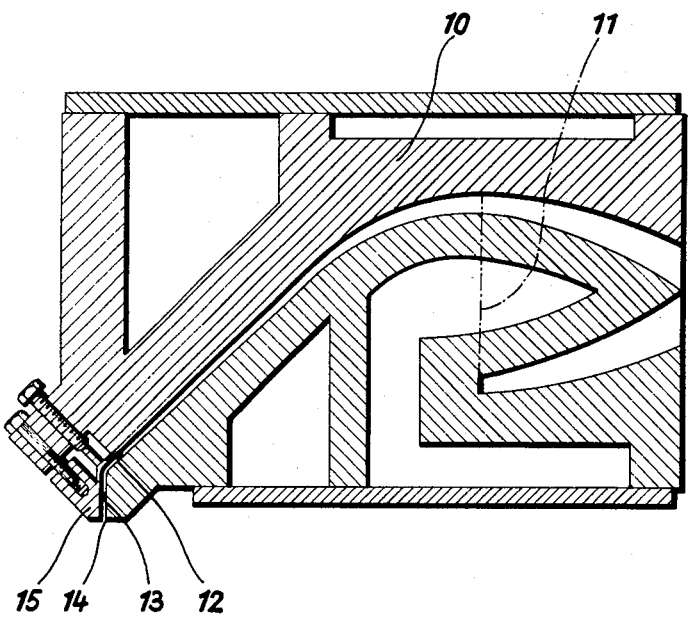

United States Patent Office 3,255,488
Patented June 14, 1966

3,255,488
WIDE SLOTTED NOZZLE FOR PRODUCING FILM
FROM EXTRUDABLE MATERIALS
Rudolf Waldherr, Beethovenstrasse 32, Erkrath, Bezirk
Dusseldorf, Germany
Filed Mar. 25, 1964, Ser. No. 354,746
3 Claims. (Cl. 18—12)

It is already known to produce film of extrudable materials by means of wide-slotted nozzles provided with an inner chamber uniformly widening from the nozzle's inlet opening towards both sides up to the nozzle's outlet slot and the adjoining zone. Due to their emergence from such a nozzle at varying speeds, the film widths usually exhibited irregularities which were mitigated to some extent in a stretching calendar, but which could not be evened out, however, in a satisfactory manner.

It has further become known, in order to overcome these disadvantages, to employ circular nozzles for producing tubular film, to cut open the resulting tube and to flatten it out. Thus, by using an uniform discharge speed at all points of the circular nozzle, there was achieved a satisfactory cross-sectional dimension and an uniform character transversely to the running direction of the extrusion. The advantage achieved in this manner was forfeited, however, due to the film's tendency to roll up. Due to the effort required to reform and to neatly roll up the film, the useful value of these products was either lost or inconsequential.

Finally, yet another wide-slotted nozzle became known, which was provided with an inner chamber uniformly widening from the nozzle's inlet opening towards either side and parallel to the nozzle's outlet opening. A planar geometrical development corresponding to a circular-shaped ring slot was to be used, while a uniformly extending zone was associated with the nozzle's bent wide side. Since in this nozzle there was employed, theoretically, a cross-section extending from a circular slot, but in practice an inlet opening of full circular cross-section, the latter lacked uniformity when changing over from the inlet opening to the geometric planar zone during the flow and formation of the film. A further disadvantage consisted of the arcuate irregularities forming transversely to the film. Finally, this wide-slotted nozzle was not useful in production set-ups in which a further manipulation was to follow directly, since the film was younger in the center than at the edges.

According to the invention, these disadvantages are overcome by a wide-slotted nozzle for producing film from extrudable material, in which the passage or guidance for the material to be extruded changes from an annular-shaped channel into a wide flat channel, transverse to the vertical cross-section of the flow while maintaining an uniformity of the passage length of all the adjacent zones disposed in the direction of the flow from the annular-shaped cross-section to the flat wide cross-section.

It is further proposed, according to the invention, that a uniform flow zone be joined at the wide cross-section.

These and other important objects of the invention will become apparent from the following description and the accompanying drawing illustrating a preferred embodiment of the invention.

It should be understood, however, that these are given by way of illustration and not of limitation, and that various changes in the details, form and arrangement of the parts may be made without departing from the scope of the invention.

In the drawing:

FIG. 3 is a longitudinal section of the nozzle.

Figure 1:
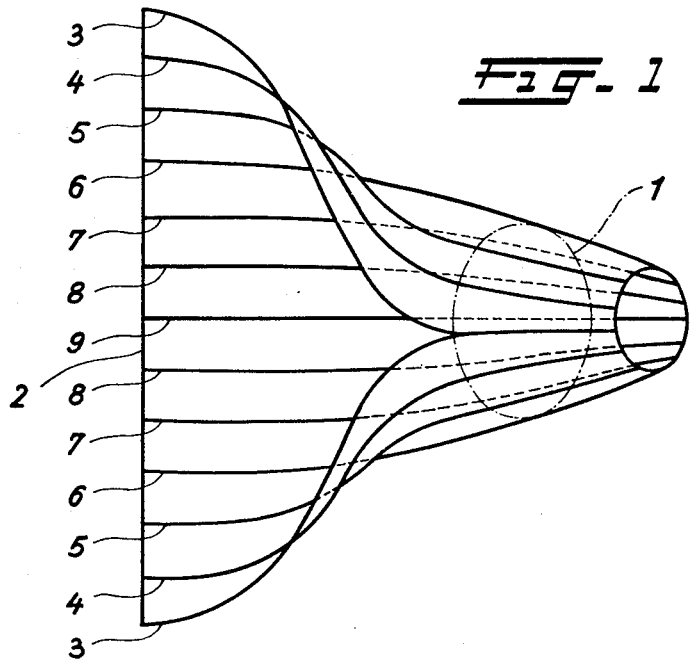
FIG. 1 is a schematic view, from below, partly from the side of the direction of the flow.
Figure 2:
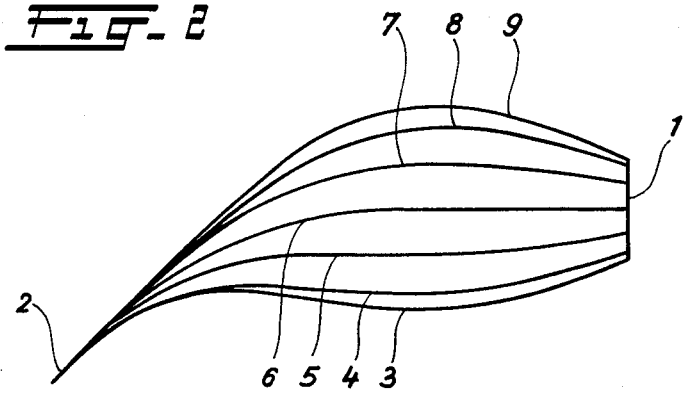
FIG. 2 is a schematic side view of the flow.

It will be seen, from FIGS. 1 and 2, that a path of uniform length is maintained from the annular slot 1 up to the rectilinear wide flat outlet opening of an extruding nozzle in all adjacent zones 3 to 9 extending in the direction of the flow.

In FIG. 3, in a path maintained at an uniform length in all zones lying in the direction of the flow, a uniform flow zone 13 joins a broad-slotted nozzle 10 from a circular crevice 11, to a rectilinear flat spreader slot, while the outlet opening 14 is adjustable by means of an elastic lip 15.

What I claim is:

1. A wide-slotted nozzle for making film from extrudable materials, comprising a nozzle body having a channel of annular cross-section, a flat spreader slot and a channel of rectilinear cross-section connecting said annular cross-section channel and said flat spreader slot, the length of the channel's path being maintained uniformly in all the adjacent zones extending in the direction of the film's flow.

2. The nozzle according to claim 1, wherein said spreader slot is further provided with width adjustment means.

3. The nozzle according to claim 1, wherein said spreader slot is defined by spaced parallel flat zone-forming surfaces.

References Cited by the Examiner

UNITED STATES PATENTS

| 2,734,224 | 2/1956 | Winstead | 18—128 |
| 3,059,277 | 10/1962 | Pierce et al. | |
| 3,063,095 | 11/1962 | Limback | 18—128 |

FOREIGN PATENTS

| 414,688 | 8/1946 | Italy. |

WILLIAM J. STEPHENSON, *Primary Examiner.*